No. 683,564. Patented Oct. 1, 1901.
W. H. LOOP.
ELECTRIC APPLIANCE FOR TREATMENT OF DEFECTIVE HEARING.
(Application filed Sept. 29, 1900.)
(No Model.)

Witnesses:
John W. Stanton
Charles F. Doyle

Inventor:
W. H. Loop

United States Patent Office.

WILLIAM H. LOOP, OF COHOES, NEW YORK.

ELECTRIC APPLIANCE FOR TREATMENT OF DEFECTIVE HEARING.

SPECIFICATION forming part of Letters Patent No. 683,564, dated October 1, 1901.

Application filed September 29, 1900. Serial No. 31,556. (No model.)

*To all whom it may concern:*

Be it known that I, WILLIAM H. LOOP, a citizen of the United States, residing at Cohoes, in the county of Albany and State of New York, have invented a new and useful Machine or Appliance for the Treatment, Restoration, and Cure of Impaired and Defective Hearing, of which the following is a specification.

My invention relates to mechanical appliances for the treatment and cure of impaired hearing and deafness; and the objects of my invention are to produce an appliance by which the action of the sound-waves upon the tympanic membrane of the ear will be intensified and by which electricity may be used to relieve and cure deafness. I attain these objects by means of the mechanism and process hereinafter described, and illustrated in the accompanying drawings, in which—

Figure 1:
Figure 2:

Figure 1 is a side view of my device, and Fig. 2 is a top plan view of the same.

My device, as shown in said drawings, consists of flexible metallic wire closely coiled in the form of a tube, cylindrical in shape, open at both ends, and preferably made with a flare or trumpet-shaped opening at one end. The coiled wire is intended to be inserted in the ear, with the larger end or flare outward, but the whole device small enough to be entirely within the ear. In practice I construct each tube of two separate wires, one copper and one zinc, coiled together, so as to form alternate layers of copper and zinc from one end of the tube to the other. When so constructed, a low current of electricity may be generated by the action of a weak acid on the coiled wires, the copper wire acting as the anode and the zinc wire as the cathode, or a thin sprinkling of dry powdered sal-ammoniac may be placed upon the coiled-wire tubes before being placed in the ears, and the moisture of the ear on the sal-ammoniac will produce sufficient acid to act upon the wires to generate the desired current, or in some cases the natural moisture of the ear will be sufficient without any acid. The current of electricity assists in carrying the sound-waves from the outer ear to the inner ear, and thus makes the sounds much more distinct and audible. At the same time the electric current acts beneficially on the nerves of the ear, increases the circulation, stimulates the nerves and tissues, and tends to cure deafness and restore hearing. The wires forming the tubes are delicate and flexible, readily adapting themselves to the conformation of the external auditory canal of the ear, and are so shaped as to gather in the sound-waves, and by the sympathetic vibration of the wires the volume of sound is increased and magnified and the natural passage of sound-waves to the ear left open and unobstructed.

My device is simple and inexpensive. It may be used by any one at any time without pain or inconvenience and is invisible to others while being used. It may be used with or without the artificial electric current, according to the needs of the particular cases. It always improves defective hearing and often entirely cures deafness.

I do not limit myself to any particular shape of tubes or material for construction of the wires.

What I claim as my invention, and desire to secure by Letters Patent, is—

1. As an appliance for the alleviation of deafness the combination of a flexible metallic tube, constructed of zinc and copper wire, coiled together so as to form alternate layers one of said wires forming an anode and one a cathode, and being in form adapted for introduction into the external auditory canal of the human ear, and adapted to generate galvanic electricity when acted upon by the proper exciting-acids, substantially as described and for the purposes set forth.

2. An article of manufacture, consisting of an electric appliance composed of a copper and a zinc wire, coiled together forming a flexible metallic tube, having a trumpet-shaped opening at one end and adapted to be inserted into the external auditory canal of the ear, and one of said wires adapted to act as an anode and the other as a cathode when acted upon by proper acid, all substantially as described and for the purposes set forth.

In testimony whereof I have signed my name to this specification in the presence of two subscribing witnesses.

WM. H. LOOP.

Witnesses:
WILLIAM DOTY,
JOHN W. STANTON.